May 27, 1958  C. B. HOBSON  2,836,111
CULTIVATOR
Filed Jan. 30, 1956  2 Sheets-Sheet 1
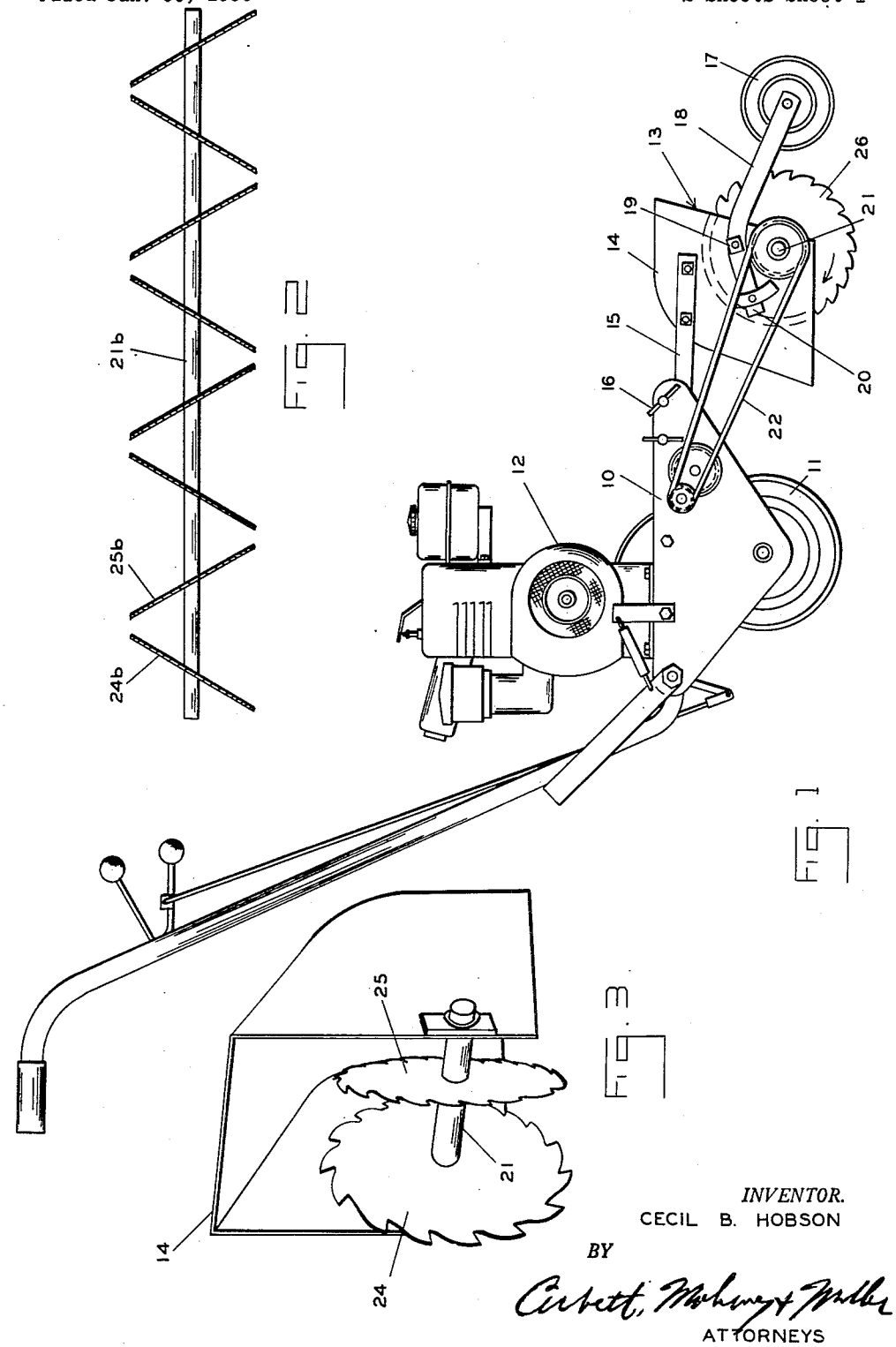
INVENTOR.
CECIL B. HOBSON
BY
Corbett, Mahoney & Miller
ATTORNEYS May 27, 1958 — C. B. HOBSON — 2,836,111
CULTIVATOR
Filed Jan. 30, 1956 — 2 Sheets-Sheet 2
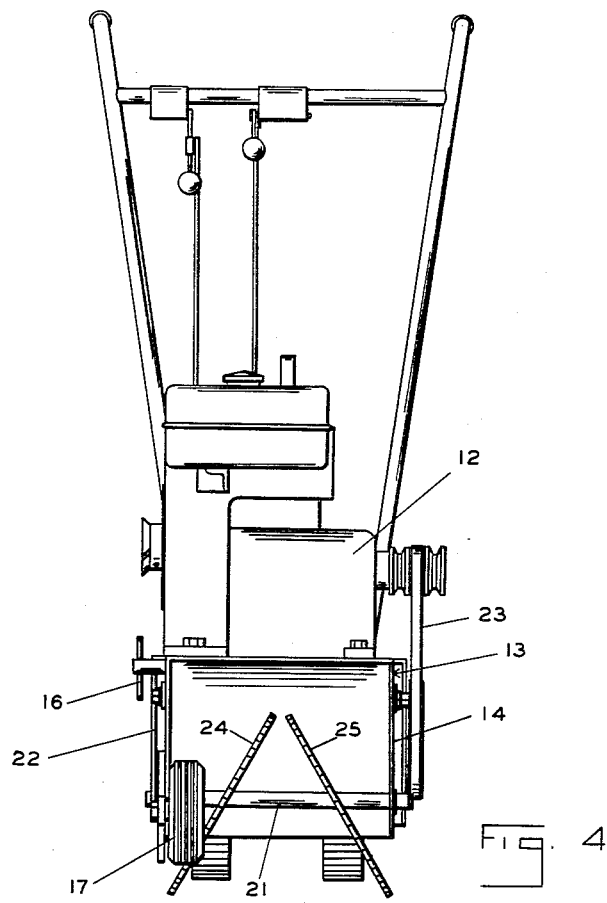
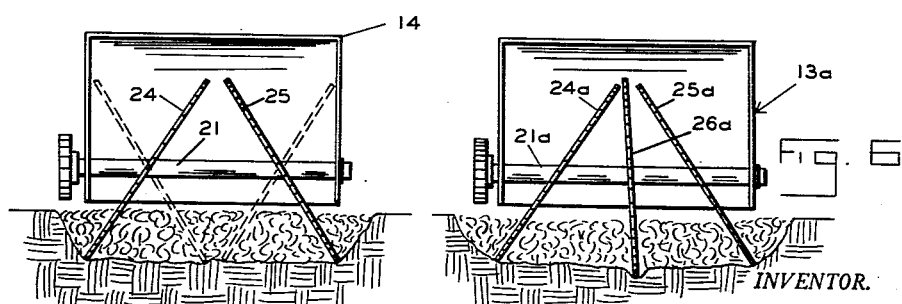
INVENTOR.
CECIL B. HOBSON
BY
ATTORNEYS

2,836,111
CULTIVATOR

Cecil B. Hobson, Marysville, Ohio

Application January 30, 1956, Serial No. 562,049

2 Claims. (Cl. 97—40)

My invention relates to a cultivator. It relates, more particularly, to a machine which can be made as a self-powered or tractor-propelled unit which is useful as a garden cultivator, corn cultivator, bean cultivator and for other cultivating or earth-preparing operations.

According to my invention, I provide a cultivator which includes cultivating blades of the disc type but which are provided with serrated earth-working edges. These blades are keyed on a rotatable shaft, the blades being set on the shaft at an angle to the axis thereof so that they wobble as they rotate. Each blade will cut a groove in the earth of a width equal to the amount of angular displacement of the blade in both directions from a plane perpendicular to the shaft axis. The blades are disposed at reversed angles relative to each other so that the edges thereof in the earth will gradually converge and diverge as the shaft is rotated. The result is that the blades' teeth will cut into the earth and work it laterally from the center of the unit at the point of convergence of the blades to their most divergent points. Each blade will be working the earth at a single radial point only with the result that more complete working of the earth will be accomplished, yet with a minimum amount of power. The earth-working blades are used in equal numbers of reversed blades so that the earth-working operation will not develop imbalances which would tend to move the entire machine laterally.

In the accompanying drawings I have illustrated one form of my invention but it may take other specific forms without departing from the basic principles of the invention. In these drawings:

Figure 1 is a side-elevational view of a garden cultivator embodying my invention.

Figure 2 is a view illustrating an arrangement of a greater number of the earth-working blades.

Figure 3 is a detailed view showing a pair of the earth-working blades.

Figure 4 is a front-elevational view of the machine.

Figure 5 is a detail in front elevation of the cultivating blades and illustrating their action.

Figure 6 is a view similar to Figure 5 but showing the use of a center earth-working disk between the earth-working blades.

With reference to the drawings, I have shown my invention on a self-propelled garden tractor. This tractor consists of a frame 10 carried by the propelling wheels 11 which are driven by a suitable drive from the engine 12. This tractor is of common form.

Attached to the front end of the frame 10 is the cultivator unit of my invention and which is indicated generally by the numeral 13. This unit 13 comprises a housing or hood 14 which is open at its lower and front sides. The housing 14 is carried by a support 15 which is removably attached to the frame 10 by suitable clamps 16. A gauge wheel 17 is provided ahead of the housing 14 and is carried on the forward end of an arm 18 which is pivoted to the housing at 19. The arm 18 can be adjusted about the pivot 19 and be held in adjusted position by a clamping bolt 20 which fits in an arcuate slot in the wall of the housing 14. Transversely of the housing 14, a shaft 21 is rotatably mounted therein. This shaft is driven by a chain and sprocket drive 22 from the tractor and is driven at a higher rate of linear speed than the tractor propelling wheels 11 which are driven by a belt drive 23.

Mounted on the shaft 21 within the housing 14 are the reversed angle earth-working or cultivating blades 24 and 25 of my invention as shown in Figures 1, 3 and 4. These blades are of disk form but have serrated edges, as shown best in Figure 1, so that large earth-working teeth 26 are formed on the edges. I have shown one pair only of these blades but they may be provided in any suitable equal number of reversed angle blades. The blades are fixed to the shaft 21 in angular relationship to the axis thereof so that they will wobble as they rotate. The blades 24 and 25 are disposed at reverse angles so that the edges thereof will gradually converge and diverge as the shaft 21 is rotated.

The action of the blades in the earth is illustrated in Figure 5. In full-line position they are shown with their working edges in the earth in diverging relationship, and in dotted-line position in converging relationship. Each blade will produce in the earth a trough or groove of a width corresponding substantially to the total amount of displacement of the blade on the shaft in both directions from a plane perpendicular to the shaft axis. Each blade will be working the earth and tend to move it laterally at a single angular point rather than through a considerable angular surface. The result is that the earth will be worked more effectively with a minimum power requirement. The blades will be set as close to each other as possible and because they are used in a pair, balance of each other will result and there will be no tendency for the unit to move laterally. The teeth on the blades will work the earth and help pull the unit along as shown in Figure 1. The wheel 17 may be adjusted vertically relative to the wheels 11 to gauge the depth of cut of the blades 24 and 25.

In Figure 6 I show a unit 13a which is identical to the unit 13 except that a central earth-working blade 26a is provided between the blades 24a and 25a to keep rocks or other objects from wedging between the blades and to work the slight width of earth between the blades 24a and 25a which is not worked by such blades. The blade 26a is of slightly larger diameter than the blades 24a and 25a so that it will form a deeper valley to retain moisture. Also, the blade 26a is at a slight angle relative to the shaft 21a sufficient to work the ground between the closest spacing of the blades 24a and 25a.

In Figure 2, I have shown how the blades can be arranged in a series of reversed blades 24b and 25b of equal numbers. Using reversed blades of equal numbers prevents them from creating lateral imbalances in the machine. In this series, the central blades can be used between the angled blades similar to the disclosure in Figure 6 but they also should be used in equal numbers and angled reversely so as not to disturb the balance of the machine.

It will be apparent that I have provided a cultivator which will effectively work the ground with minimum power. The cultivator may be self-propelled, may be used as an attachment on a tractor and may be pulled or pushed, and may be driven by a power take-off from the tractor.

Various advantages have been mentioned and others will be apparent.

Having thus described my invention, what I claim is:

1. A cultivator comprising a frame carried by traction wheels for movement along the earth to be cultivated, a shaft carried by said frame, a pair of earth-working blades of serrated disk-like form, said blades being disposed on said shaft in angular relationship to the axis thereof so that they wobble as they rotate, and produce parallel grooves in the earth as the frame is moved along on said wheels, said blades being disposed in reverse angular relationship relative to the shaft axis so that they substantially converge at one peripheral point and gradually diverge to a maximum amount at a diametrically opposed point, a serrated earth-working blade disposed between said pair of blades substantially normal to the axis of said shaft but at a slight angle thereto and of larger diameter than said pair of blades so that it extends radially between the converging portions of said pair of blades beyond the outer edges thereof to prevent lodging of objects between said blades and to work the earth in the space between said blades as the frame is moved along on said wheels to create a moisture collecting deeper trough between the adjacent troughs created by said pair of blades, and means for driving all the blades about the axis of said shaft as the frame is moved along.

2. A cultivator according to claim 1 including a gauge wheel carried by said frame for limiting the amount of penetration into the ground of said disks.

References Cited in the file of this patent

UNITED STATES PATENTS

| | | |
|---|---|---|
| 1,635,612 | Dick et al. | July 12, 1927 |
| 2,244,099 | Chase | June 3, 1941 |
| 2,679,794 | Ober | June 1, 1954 |